US012602935B2

(12) United States Patent
Sakai et al.

(10) Patent No.: US 12,602,935 B2
(45) Date of Patent: Apr. 14, 2026

(54) DRIVING ASSISTANCE DEVICE AND DRIVING ASSISTANCE METHOD

(71) Applicant: Hitachi Astemo, Ltd., Hitachinaka (JP)

(72) Inventors: Takahiro Sakai, Tokyo (JP); Morihiko Sakano, Tokyo (JP); Hideyuki Kume, Tokyo (JP); Hitoshi Hayakawa, Hitachinaka (JP); Tatsuhiko Monji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 323 days.

(21) Appl. No.: 18/562,754

(22) PCT Filed: Feb. 4, 2022

(86) PCT No.: PCT/JP2022/004528
§ 371 (c)(1),
(2) Date: Nov. 20, 2023

(87) PCT Pub. No.: WO2023/276225
PCT Pub. Date: Jan. 5, 2023

(65) Prior Publication Data
US 2024/0273920 A1 Aug. 15, 2024

(30) Foreign Application Priority Data
Jul. 1, 2021 (JP) ................................. 2021-110032

(51) Int. Cl.
*G06V 20/56* (2022.01)
*B60W 30/12* (2020.01)
(Continued)

(52) U.S. Cl.
CPC ........... *G06V 20/588* (2022.01); *B60W 30/12* (2013.01); *G06V 10/44* (2022.01); *G06V 10/60* (2022.01);
(Continued)

(58) Field of Classification Search
CPC ............. B60W 30/12; B60W 2552/53; B60W 2420/403; G06V 20/588; G06V 10/44;
(Continued)

(56) References Cited

U.S. PATENT DOCUMENTS

2010/0259617 A1 10/2010 Kawasaki et al.
2014/0211014 A1 7/2014 Kawasaki et al.
(Continued)

FOREIGN PATENT DOCUMENTS

JP 2010-244456 A 10/2010
JP 2015-069289 A 4/2015
(Continued)

OTHER PUBLICATIONS

International Search Report with English Translation of International Patent Application No. PCT/JP2022/004528 dated Mar. 22, 2022 (5 pages).

*Primary Examiner* — Matthew C Bella
*Assistant Examiner* — Janice E. Vaz
(74) *Attorney, Agent, or Firm* — Foley & Lardner LLP

(57) ABSTRACT

A driving assistance device that recognizes a lane marking around an own vehicle with at least one sensor includes a lane marking detection unit that detects lane marking information from data acquired by the sensor, a lane marking type candidate estimation unit that recognizes a lane marking type from the detected lane marking information and calculates a likelihood of each lane marking type, a lane marking type branch point estimation unit that detects a lane marking type branch point that is a point at which a likelihood of the lane marking type changes with respect to an advancing direction of the own vehicle, and distinguishes regions before and after the lane marking type branch point as a first region and a second region, and a lane marking information integration unit that, in a case where a lane (Continued)

marking of the first region and a lane marking of the second region have the same lane marking type, integrates the lane marking of the first region and the lane marking of the second region into a continuously recognizable lane marking.

15 Claims, 14 Drawing Sheets

(51) Int. Cl.
*G06V 10/44* (2022.01)
*G06V 10/60* (2022.01)
(52) U.S. Cl.
CPC ... *B60W 2420/403* (2013.01); *B60W 2552/53* (2020.02); *B60W 2556/40* (2020.02)

(58) Field of Classification Search
CPC ............. G06V 10/806; G08G 1/09626; G08G 1/096775
See application file for complete search history.

(56) References Cited

U.S. PATENT DOCUMENTS

| | | | |
|---|---|---|---|
| 2018/0237019 A1 | 8/2018 | Goto et al. | |
| 2020/0265246 A1 | 8/2020 | Machii et al. | |
| 2022/0383646 A1* | 12/2022 | Hosoya | ..................... G06T 7/70 |

FOREIGN PATENT DOCUMENTS

| | | |
|---|---|---|
| JP | 2019-067159 A | 4/2019 |
| WO | WO-2016/159172 A1 | 10/2016 |

* cited by examiner (a)    ROAD MARKING    (b)    LANE MARKING CANDIDATE    (c)

LANE MARKING (a)    (b)

OWN VEHICLE

-90    0    +90

(a)    (b)    LANE MARKING POSITION

SAMPLING INTERVAL

FIG. 8

| SENSOR TYPE | LANE MARKING ID | SINGLE LINE (LIKELIHOOD) | DOUBLE LINE (LIKELIHOOD) | · · · | LANE MARKING POSITION |
|---|---|---|---|---|---|
| CAMERA | 1 | 1.0 | 0.0 | · · · | POINT SEQUENCE COORDINATES |
| CAMERA | 2 | 0.2 | 0.6 | · · · | POINT SEQUENCE COORDINATES |
| LiDAR | 3 | 1.0 | 0.0 | · · · | POINT SEQUENCE COORDINATES |

LANE MARKING INFORMATION

FIG. 9

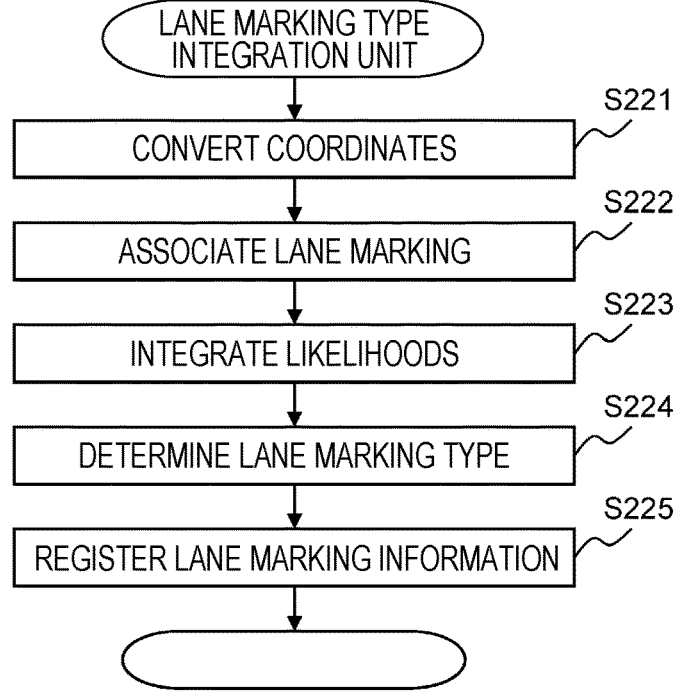

```
  LANE MARKING TYPE
  INTEGRATION UNIT

CONVERT COORDINATES            S221

ASSOCIATE LANE MARKING         S222

INTEGRATE LIKELIHOODS          S223

DETERMINE LANE MARKING TYPE    S224

REGISTER LANE MARKING INFORMATION   S225
```

FIG. 10

| LANE MARKING ID | LANE MARKING TYPE | SINGLE LANE MARKING (LIKELIHOOD) | DOUBLE LANE MARKING (LIKELIHOOD) | · · · | DOT LINE (LIKELIHOOD) | ZEBRA ZONE (LIKELIHOOD) |
|---|---|---|---|---|---|---|
| 1 | SINGLE LANE MARKING | 1.0 | 0.0 | · · · | 0.0 | 0.0 |
| 2 | SINGLE LANE MARKING DOT LINE | 0.2 | 0.4 | · · · | 0.4 | 0.0 |
| 3 | SINGLE LANE MARKING ZEBRA ZONE | 0.4 | 0.2 | · · · | 0.0 | 0.4 |

INTEGRATED LANE MARKING INFORMATION

FIG. 15
LANE MARKING INFORMATION
INTEGRATION UNIT
CONVERT COORDINATES    S261
ASSOCIATE LANE MARKING    S262
INTEGRATE LANE MARKINGS    S263
FIG. 16
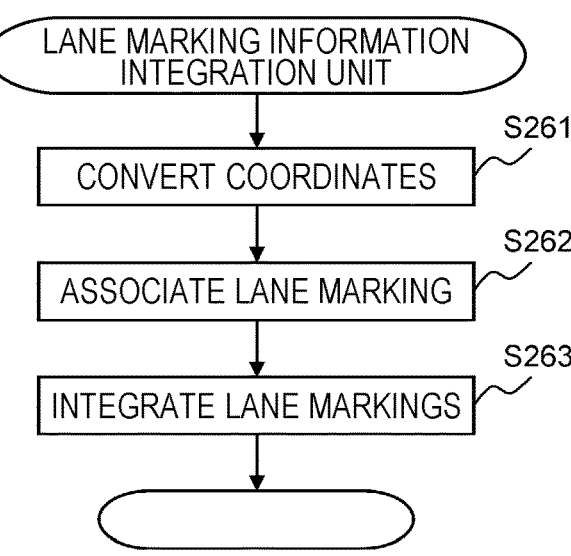
FIG. 17
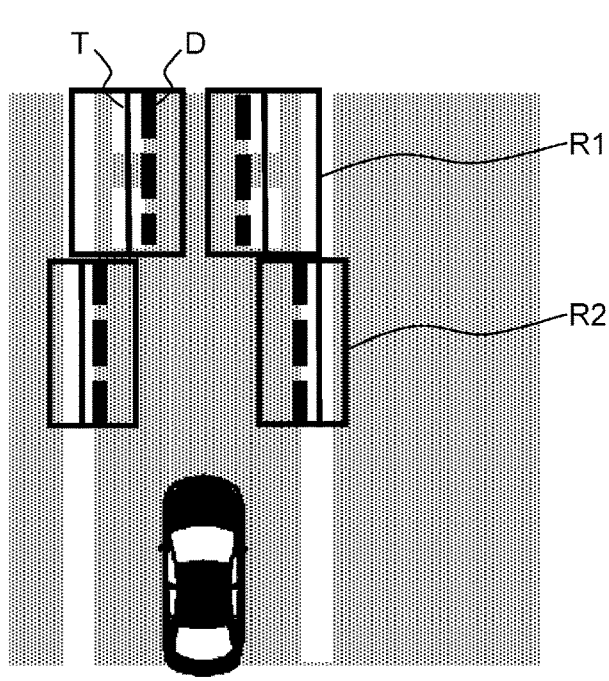

| SENSOR TYPE | DISTURBANCE | LANE MARKING TYPE | WEIGHT (RELIABILITY) |
|---|---|---|---|
| STEREO CAMERA | BACKLIGHT | SINGLE LANE MARKING | 0.5 |
| PERIPHERAL VISION CAMERA | BACKLIGHT | SINGLE LANE MARKING | 0.5 |
| LiDAR | BACKLIGHT | SINGLE LANE MARKING | 1.0 |
| . . . | . . . |  | . . . |

SENSOR TYPE AND DISTURBANCE INFLUENCE LIST (b)

| SURROUNDING SITUATION | LANE MARKING TYPE | LANE MARKING LIKELIHOOD INITIAL VALUE (APPEARANCE PROBABILITY) |
|---|---|---|
| DOWNWARD CURVE | DOT LINE | 0.5 |
| MERGING INTO EXPRESSWAY | DASHED LINE, ZEBRA ZONE | 0.5 |
| MERGING INTO EXPRESSWAY | ORANGE LINE | 0.0 |
| BEFORE INTERSECTION | ZEBRA ZONE | 0.3 |
| . . . | . . . | . . . |

SURROUNDING SITUATION AND APPEARANCE PROBABILITY OF LANE MARKING TYPE (a)

(b)

| SENSOR TYPE | SCENE | LANE MARKING TYPE | LANE MARKING POSITION RELIABILITY |
|---|---|---|---|
| STEREO CAMERA | BACKLIGHT | SINGLE LINE | 0.5 |
| PERIPHERAL VISION CAMERA | BACKLIGHT | SINGLE LINE | 0.5 |
| LiDAR | BACKLIGHT | SINGLE LINE | 1.0 |

(a)　　　　　　　　　　　　(b)

DRIVING ASSISTANCE DEVICE AND DRIVING ASSISTANCE METHOD

INCORPORATION BY REFERENCE

This application claims priority to Japanese Patent Application No. 2021-110032 filed on Jul. 1, 2021, the contents of which are incorporated herein by reference.

TECHNICAL FIELD

The present invention relates to a driving assistance device.

BACKGROUND ART

Currently, various driving assistance systems have been developed and commercialized. Among these, in order to realize applications such as a lane keeping system and a lane change system, it is necessary to detect and track a lane marking around a vehicle with high accuracy by using a sensor mounted on the vehicle.

In a case of tracking a lane marking, a Kalman filter is generally used. In this method, an object position at the next time can be predicted from an object position up to the previous time. However, if a white line being tracked cannot be correctly associated with obtained observation (a detected lane marking position), the accuracy of prediction decreases. In association between lane markings, a position, a shape, and the type of a lane marking are used. However, in the existing method, one lane marking type is generally assigned to an observed lane marking, but in a case of a sensor having a wide observation range, a plurality of lane marking types may be included. Thus, in a place where a lane marking type changes frequently, such as a merging lane of an expressway or near an intersection, it is difficult to correctly determine a lane marking type, and tracking of a lane marking may fail.

Background art of the present technical field includes the following prior art. PTL 1 (JP 2010-244456 A) discloses a boundary recognition device in which a boundary line candidate extraction unit extracts a boundary line candidate of a lane on a road from an image acquired by an in-vehicle camera by using known image processing such as pattern matching or Hough transform, one or more types of boundary line feature calculation units calculate a certainty factor of a boundary line likelihood of the extracted boundary line candidate with a likelihood, a boundary line feature integration unit multiplies and integrates the calculated likelihoods to output a likelihood indicating the boundary line likelihood, a boundary line selection unit selects a boundary line candidate having a maximum likelihood among the output likelihoods as a boundary line on the road, and the boundary line feature calculation unit calculates a likelihood of the boundary line candidate by using a luminance variance, an internal edge amount, and the like, and uses a feature amount detected by a road surface feature extraction unit or the like to change and output the likelihood of the boundary line candidate.

SUMMARY OF INVENTION

Technical Problem

Systems that utilize surrounding lane marking information, such as lane keeping systems and lane change systems, require stable lane marking information over a long period of time. In order to obtain stable lane marking information for a long period of time, since there is a possibility that the observation results for one frame only may include instantaneous non-detection or erroneous detection, it is therefore necessary to associate recognition results for each of frames and integrate observation results for several frames. In a case where the technique disclosed in PTL 1 is applied, only one lane marking type can be assigned to an observation result. Therefore, even in a case where a lane marking type changes frequently, one lane marking type e included most in observation results is assigned, and thus association of lane markings may fail. Since an output lane marking position depends on a lane marking type, it is desirable to assign a lane marking type to each region instead of assigning one lane marking type to an observation result.

Therefore, an object of the present invention is to provide a driving assistance device that tracks a lane marking with high accuracy by using a sensor attached to a vehicle.

Solution to Problem

A representative example of the invention disclosed in the present application is as follows. That is, a driving assistance device that recognizes a lane marking around an own vehicle with at least one sensor includes a lane marking detection unit that detects lane marking information from data acquired by the sensor; a lane marking type candidate estimation unit that recognizes a lane marking type from the detected lane marking information and calculates a likelihood of each lane marking type; a lane marking type branch point estimation unit that detects a lane marking type branch point that is a point at which a likelihood of the lane marking type changes with respect to an advancing direction of the own vehicle, and distinguishes regions before and after the lane marking type branch point as a first region and a second region; and a lane marking information integration unit that, in a case where a lane marking of the first region and a lane marking of the second region have the same lane marking type, integrates the lane marking of the first region and the lane marking of the second region into a continuously recognizable lane marking.

Advantageous Effects of Invention

According to one aspect of the present invention, a lane marking can be tracked with high accuracy by using a sensor attached to a vehicle. Problems, configurations, and effects other than those described above will be clarified by the following description of embodiments.

BRIEF DESCRIPTION OF DRAWINGS

FIG. 8 is a diagram illustrating an example of lane marking information according to Example 1.

FIG. 9 is a flowchart illustrating processing executed by a lane marking type integration unit of Example 1.

FIG. 10 is a diagram illustrating an example of integrated lane marking information according to Example 1.

FIG. 15 is a flowchart illustrating processing executed by a lane marking information integration unit according to Example 1.

FIG. 16 is a diagram illustrating an example of a lane marking information integration method according to Example 1.

FIG. 17 is a diagram illustrating an example of a lane marking information integration method according to Example 1.

FIG. 22 is a diagram illustrating an example of a list used by a lane marking type integration unit according to Example 2.

DESCRIPTION OF EMBODIMENTS

Example 1

Figure 1:
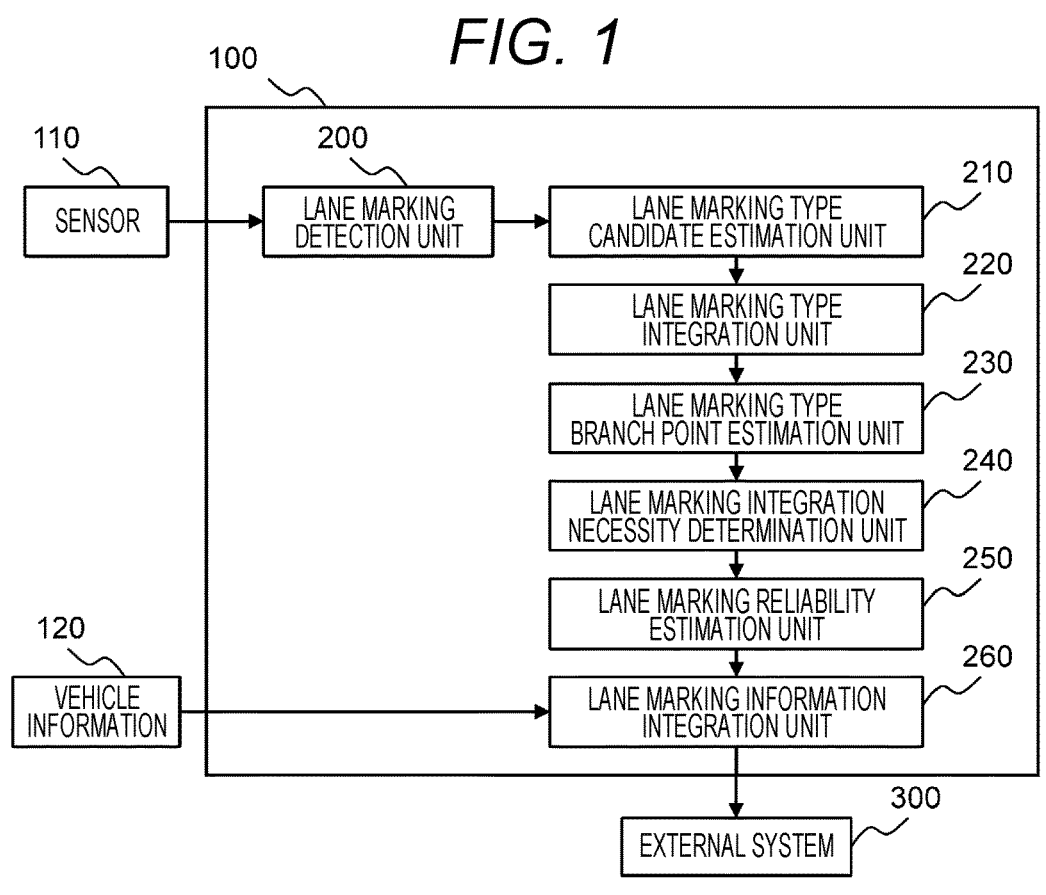
FIG. 1 is a diagram illustrating a configuration of a driving assistance device according to Example 1.

FIG. 1 is a diagram illustrating a configuration of a driving assistance device 100 according to Example 1 of the present invention. The driving assistance device 100 illustrated in FIG. 1 is mounted on a mobile object such as a passenger car, and is used in combination with an external system 300. Hereinafter, a mobile object on which the driving assistance device 100 is mounted will be referred to as an "own vehicle". The driving assistance device 100 repeatedly operates at predetermined timings (for example, every 50 milliseconds). The driving assistance device 100 has a function of acquiring data from various sensors 110 such as a camera and LiDAR mounted on the own vehicle, and a function of acquiring vehicle information 120 such as a speed, a steering wheel steering angle, a shift brake, and a state of a direction indicator from the vehicle.

As illustrated in FIG. 1, the driving assistance device 100 includes, as functions thereof, a lane marking detection unit 200, a lane marking type candidate estimation unit 210, a lane marking type integration unit 220, a lane marking type branch point estimation unit 230, a lane marking integration necessity determination unit 240, a lane marking reliability estimation unit 250, and a lane marking information integration unit 260, and outputs a calculation result to the external system 300. The driving assistance device 100 includes, for example, a CPU and a GPU which are arithmetic devices, and a RAM and a ROM which are storage devices, and can realize these functions by loading a predetermined program stored in the ROM onto the RAM and executing the program in the CPU. Some or all of the functions of the driving assistance device 100 may be realized by using a hardware arithmetic device such as an FPGA or an ASIC.

Data acquired by a sensor 110 attached to the own vehicle and vehicle information 120 acquired from the own vehicle via a network such as CAN are input to the driving assistance device 100. The driving assistance device 100 sequentially acquires data at a predetermined frame rate from the sensor 110 (for example, a camera or a LiDAR) mounted on the own vehicle. The vehicle information 120 indicates information regarding movement of the own vehicle obtained from the own vehicle and information equivalent thereto, and is, for example, a vehicle speed, a steering wheel angle, a vehicle turning radius, a state of an accelerator or a brake, and a state of a shift lever. Similarly to the information obtained from the sensor 110, the vehicle information 120 is sequentially acquired at a predetermined frame rate.

The lane marking detection unit 200 detects a lane marking from the data obtained from the sensor 110. It is assumed that detection of a lane marking is performed by using a known method, and for example, in the case where a lane marking is extracted from an image, there are a line segment detector (LSD), Hough transform, and the like. The lane marking detection unit 200 outputs position information of the detected lane marking to the lane marking type candidate estimation unit 210.

The lane marking type candidate estimation unit 210 estimates a lane marking type to which each lane marking detected by the lane marking detection unit 200 is likely to belong. For the estimation of the lane marking type, a known method, for example, pattern matching using a pattern of the lane marking type, or a lane marking model in which periodicity for each lane marking type is modeled may be used. The lane marking type candidate estimation unit 210 outputs the lane marking type determination result to the lane marking type integration unit 220.

The lane marking type integration unit 220 integrates information regarding the type of each lane marking estimated by the lane marking type candidate estimation unit 210 for each lane marking. As a result of the integration, a lane marking type having a certain likelihood or more is assigned as the type of lane marking. The lane marking type integration unit 220 outputs the assigned lane marking type to the lane marking type branch point estimation unit 230.

In a case where a plurality of lane marking types are assigned to one integrated lane marking as a result of integration of lane markings in the lane marking type integration unit 220, the lane marking type branch point estimation unit 230 detects a point at which a lane marking type changes. A point at which a lane marking type changes may be detected by using a ratio of lane marking types included in the integrated lane marking. In a case where a change point at which the lane marking type changes is found, a region of the lane marking before and after the change point is divided into regions, and lane marking types are assigned to the regions after division. The lane marking type branch point estimation unit 230 outputs the lane marking type assigned to each of the regions after division to the lane marking integration necessity determination unit 240.

The lane marking integration necessity determination unit 240 determines whether it is necessary to integrate the divided lane markings. A determination result is used by the lane marking information integration unit 260. Note that the lane marking integration necessity determination unit 240 is effective in a case where a road structure is complicated and there are many oblique white lines, and thus need not be provided in a case where the road structure is simple.

The lane marking reliability estimation unit 250 adds a reliability to the detected lane marking. For example, the reliability is generally determined by decreasing the reliability of a lane marking detected by a camera as the lane marking becomes farther from the vehicle, or increasing the reliability in a case where a lane marking is detected at the same place by a plurality of sensors 110. The lane marking reliability estimation unit 250 outputs the estimated reliability to the lane marking information integration unit 260.

The lane marking information integration unit 260 associates a lane marking being tracked with a newly observed lane marking, and integrates information regarding the associated lane markings to determine whether the lane marking is an output target lane marking. For example, the lane markings are associated with each other by using shapes, positions, types, and the like of the lane markings. Unnecessary lane markings may be excluded from output targets with reference to a lane width specified in the Road Structure Ordinance. The lane marking information integration unit 260 outputs information regarding the lane marking determined to be an output target to the external system 300.

The detection of a lane marking using each functional block described above may be performed separately for lane markings on the left side and the right side of the vehicle. Note that the consistency of lane markings detected on both sides of the vehicle may be determined with reference to a rule defined in the road structure example.

The external system 300 is, for example, a system that recognizes a lane in which the own vehicle can travel by using lane marking information, such as a lane keeping system or a lane change system, or an application that senses a surrounding environment of a route on which the own vehicle has traveled and generates a map.

Next, processing executed by the driving assistance device 100 in a case where at least one of a camera or a LIDAR is used as the sensor 110 will be described with reference to a flowchart.

Figure 2:
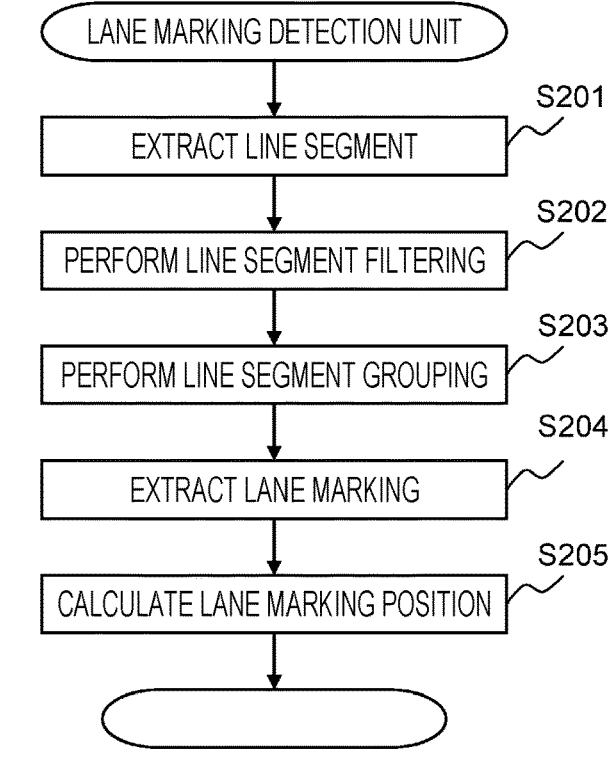
FIG. 2 is a flowchart illustrating processing executed by a lane marking detection unit of Example 1.

FIG. 2 is a flowchart illustrating processing executed by lane marking detection unit 200.

Figure 3:
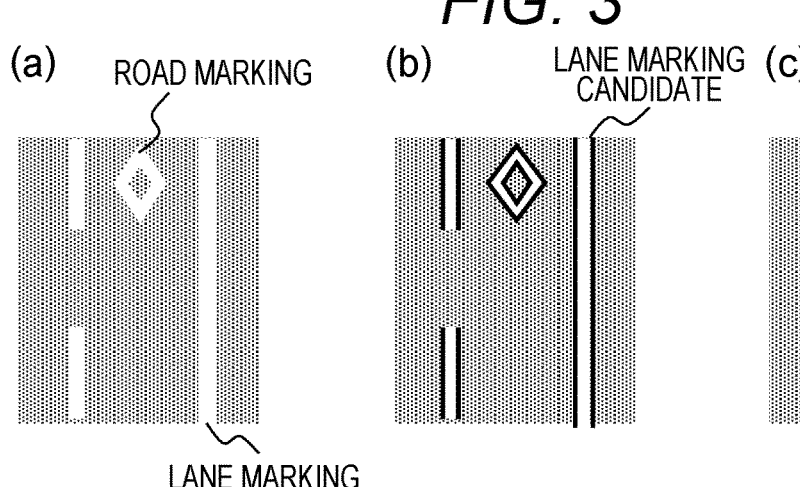
FIG. 3 is a diagram illustrating an example of a lane marking candidate extraction method according to Example 1.

First, in S201, the lane marking detection unit 200 extracts a line segment that is a lane marking candidate from acquired data. Lane marking candidates include not only general lane markings including a white line and an orange line but also lane markings including Botts' Dots, cat's eyes, and the like. FIG. 3 illustrates an example of a lane marking candidate extraction method. FIG. 3 is a bird's-eye view image converted from an image acquired by a camera attached to the front part of the own vehicle. It is assumed that a lane marking candidate is detected by using a known method, and for example, a lane marking may be extracted from an image by using a method such as a line segment detector (LSD) or Hough transform. It is possible to detect a lane marking candidate from a point sequence acquired by the LiDAR by using a method of performing road surface estimation on the basis of a vehicle posture and extracting a point sequence having a reflection intensity equal to or higher than a certain level among point sequences on a road surface.

Figure 4:
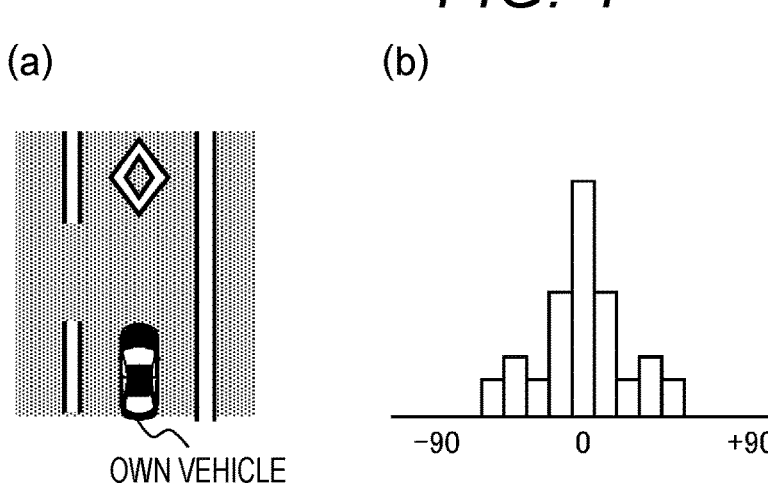
FIG. 4 is a diagram illustrating an example of a lane marking candidate extraction method according to Example 1.

Next, in S202, the lane marking detection unit 200 performs filtering to remove noise from the lane marking candidates extracted in S201. This is because in a case where a line segment is extracted by using a method such as an LSD, not only a crack of a road surface and a shadow of a utility pole or a building but also a road marking is extracted as illustrated in FIG. 3(*b*). For example, there is a method of performing filtering by using an orientation and a length of a line segment with respect to the own vehicle. Specifically, first, as illustrated in FIG. 4, an inclination of the line segment is calculated with reference to an orientation of the own vehicle, and a histogram divided at a predetermined angular interval (for example, every 10°) in a range of −90° to +90° is created with the length of the line segment as a weight. As illustrated in FIG. 3(*c*), only the range of +10° with the greatest value among the created histograms remains, and the others are discarded. The histogram described above is divided every 10° and is created with the length of the line segment as a weight, and only the largest result of ±10° remains, but various methods may be adopted as a histogram dividing method, a weighting method, and a method of determining a remaining line segment, and the present invention is not limited thereto. These numerical values may be determined from a resolution of the sensor 110 or the like. In the above description, a histogram is generated to determine a line segment to be left, but for example, a method of leaving a line segment close to the orientation of the own vehicle may be used.

Next, in S203, the lane marking detection unit 200 groups the line segments on the basis of the result in S202. That is, in a case where one lane marking is divided into a plurality of line segments through rubbing of a broken line or a white line and output, it is determined whether the plurality of line segments belong to the same group, and the line segments are grouped. For example, in the grouping of the line segments, a line segment within a predetermined threshold is set as a lane marking candidate partitioning the same lane by using a position and an angle of a lane marking candidate from the own vehicle. For example, a position of the lane marking candidate may be calculated on the basis of a position of the lane marking candidate in a vehicle lateral direction among parameters obtained by approximating each detected lane marking candidate with a straight line, and an angle calculated from an inclination with respect to a vehicle advancing direction may be calculated as an angle of the lane marking. In the present embodiment, line segments having an angle error of 10° or less with respect to a lane marking in which a difference in position between lane markings is 0.5 m or less when viewed in the vehicle lateral direction are associated with each other.

Next, in S204, the lane marking detection unit 200 extracts a lane marking from the lane marking candidates.

Figure 5:
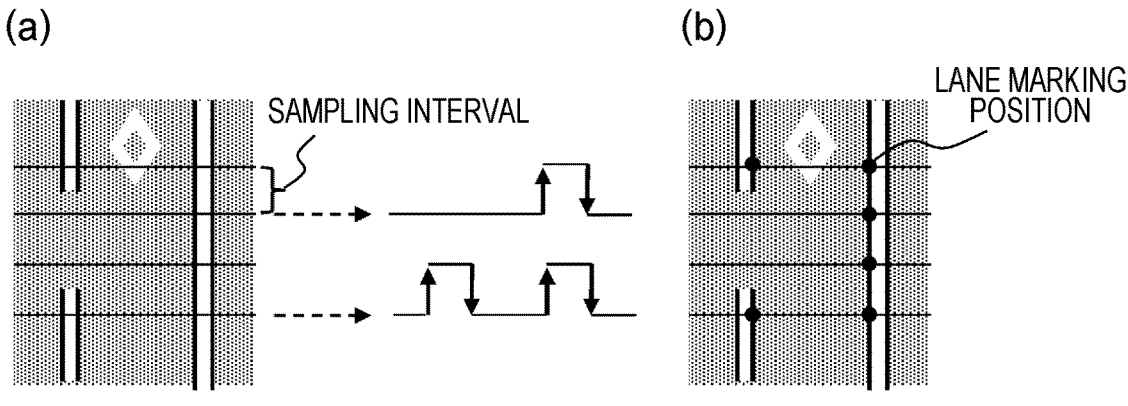
FIG. 5 is a diagram illustrating an example of a method of detecting a lane marking having a constant width according to Example 1.

Here, the lane marking is a line having a constant width. FIG. 5 illustrates an example of a method of detecting a lane marking having a constant width. In FIG. 5, a sampling interval is set at a constant width in the advancing direction of the vehicle, and the set sampling line is scanned to detect a set of points (edges of the lane marking) where the luminance changes from low to high and from high to low. Among the detected sets of points, a set having a predetermined width is extracted as a lane marking. In the present example, the predetermined width is defined as a width of 0.15 to 0.45 m defined by road marking in the Road Structure Ordinance. However, the width may be set larger or smaller on the assumption of a target to be detected.

Note that, in a case where a lane marking type includes one having a short length in the advancing direction of the vehicle such as Botts' Dots or cat's eyes, a lane marking may not be detected in a case where the sampling interval described above is long. Therefore, the method of the present example can also be applied to the Botts' Dots and the cat's eyes as long as the Botts' Dots and the cat's eyes are detected by the camera or the LiDAR.

Next, in S205, the lane marking detection unit 200 calculates a lane marking position to be used in the following processing on the basis of the lane marking positions extracted in S204. Regarding the lane marking position, an intersection point on a side close to the vehicle among intersection points of the sampling line and the lane marking set at regular intervals is set as a lane marking position. As a result, the detected lane marking is expressed as a point sequence. In the present example, although the lane marking position is expressed by the point sequence sampled at regular intervals, the lane marking position may be handled in a line state.

Figure 6:
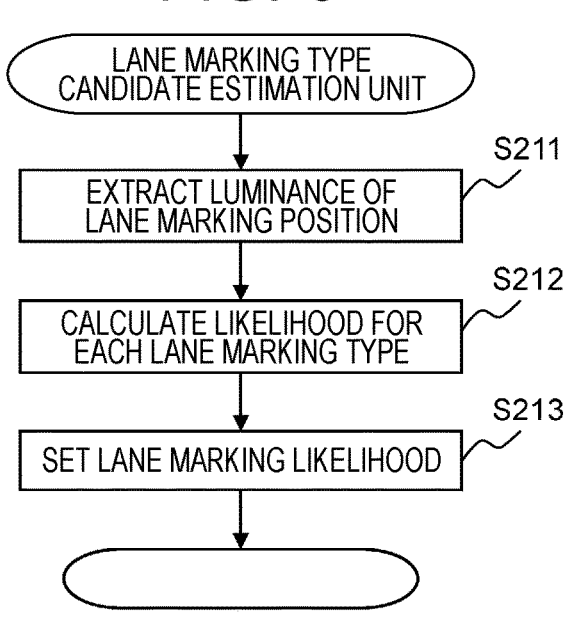
FIG. 6 is a flowchart illustrating processing executed by a lane marking type candidate estimation unit according to Example 1.

Next, the lane marking type candidate estimation unit 210 will be described with reference to FIG. 6. First, in S211, the lane marking type candidate estimation unit 210 sets a sampling interval to be a constant interval from the own vehicle, and extracts the luminance of the corresponding lane marking on the sampling line (S211). In the present example, although the sampling interval is assumed to be 1.5 m, another interval may be used.

Figure 7:
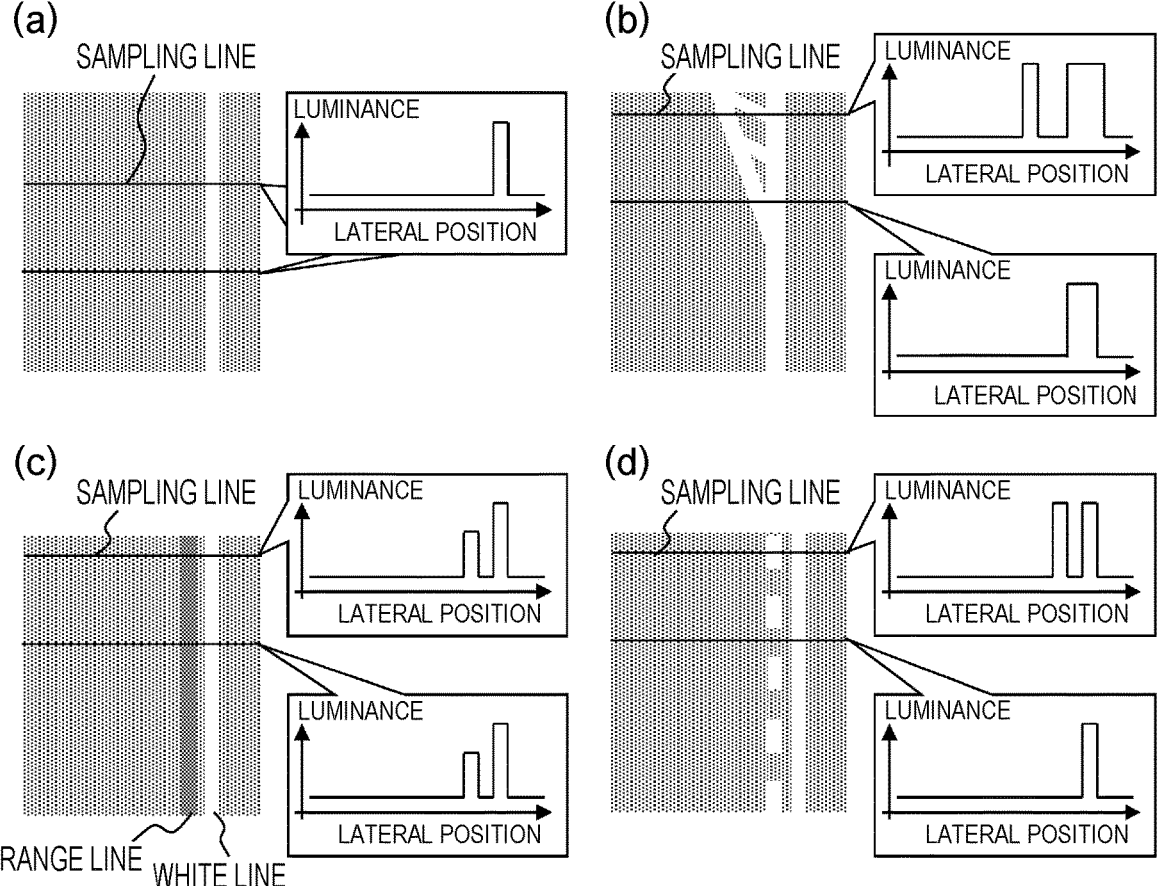
FIG. 7 is a diagram illustrating an example of a lane marking type candidate estimation method according to Example 1.

Next, in S212, the lane marking type candidate estimation unit 210 collates a graph shape obtained by plotting the luminance of the lane marking of the road surface for each sampling interval extracted in S211 with the model having the lane marking shape obtained by modeling the luminance in advance by using a known method such as template matching to obtain the matching degree. The model having the lane marking shape is a model in which a vertical axis represents luminance and a horizontal axis represents a lateral position from the vehicle as illustrated in FIG. 7. For example, in the case of a single white line as illustrated in FIG. 7(*a*), a lane marking shape model appears every cycle. In a case of a zebra pattern as illustrated in FIG. 7(*b*), a lane marking shape model in which a position and a thickness of a peak change appears. In a case of double lines including an orange line and a single white line as illustrated in FIG. 7(*c*), a lane marking shape model in which a peak on the orange line side is slightly lowered appears every cycle. In a case of a lane marking including a white broken line and a white single lane marking as illustrated in FIG. 7(*d*), a lane marking shape model in which the numbers of peaks are different appears at a constant cycle. As described above, a lane marking desired to be detected is modeled in advance for each lane marking type. As to which lane marking shape model the graph shape obtained by plotting the luminance detected for each sampling line matches, it is preferable to select the most matching one as a result of the template matching. Although a deviation occurs between the detected graph shape of the luminance and the lateral position of the lane marking shape model, this deviation is eliminated by shifting the graph shape by the vehicle lateral position of the lane marking. The final calculation for each lane marking type is determined on the basis of how much each lane shape graph has appeared in a determined region, for example, in a range of 50 m ahead of the vehicle. Since a threshold of what percentage of which lane marking shape model appears in each lane marking type differs for each sampling interval, the threshold is obtained in advance at a set sampling interval. In the present example, a detection range is set to 50 m, a lane marking type is obtained in a range of every 10 m, and a likelihood of the corresponding lane marking type is added by 0.2 to obtain a likelihood of each lane marking type. In the present example, although a likelihood is calculated by using such a method, a likelihood of a lane marking type may be calculated by using Bayesian estimation or the like on the basis of lane marking information being tracked.

Next, in S213, the lane marking type candidate estimation unit 210 registers the likelihood of the lane marking type for each lane marking estimated in S212 in a list as illustrated in FIG. 8. As illustrated in FIG. 8, a sensor type that has detected d a lane marking, a lane marking ID, a likelihood for each lane marking type, and coordinates of a point sequence representing the lane marking are registered in this list.

Next, the lane marking type integration unit 220 will be described with reference to FIG. 9. First, in S221, the lane marking type integration unit 220 converts coordinates of data acquired by the plurality of sensors 110 to integrate coordinate systems. For example, a coordinate system centered on the own vehicle is defined as +x for the front, +y for the left, +z for the vertically upward direction, and + for rotation counterclockwise around each axis with the center of tires of the rear part of the vehicle as the origin. In this case, the data obtained from each sensor 110 has an offset corresponding to attachment position and posture of the sensor 110 from this coordinate system. Therefore, by converting each data such that this offset is eliminated, all the data can be converted on the same coordinate system. In a case where the acquired data is already expressed on the same coordinate system, the process in S221 is not necessary.

Next, in S222, the lane marking type integration unit 220 associates the lane markings acquired by the respective sensors 110. Lane markings within a certain range are associated by using a distance between approximate parameters calculated from a point sequence indicating a lane marking shape. As a parameter approximating the point sequence, respective approximation parameters of a straight line, a quadratic curve, and a circle are obtained, distances between the approximation parameters and the point sequence are calculated, and a parameter having the smallest distance is set as the most suitable approximation parameter. Since a method of calculating a distance between approximation parameters and a method of calculating a distance between a point sequence and an approximation parameter are known, the description thereof will be omitted. Lane markings being tracked at this time are simultaneously associated with each other. The above method is also used for association between the lane markings being tracked. In the present example, although the association is performed by using the approximation parameter, an association method is not limited thereto.

Next, in S223, the lane marking type integration unit 220 integrates the likelihoods of the types of the lane marking associated in S222. The likelihoods are integrated by using the following formula.

[Math. 1]

$$P(T_i|S_{fc}, S_l) = \frac{P(S_{fc} \mid T_i)P(S_l|T_i)P(T_i)}{\sum_{i}^{m} P(S_{fc}|T_i)P(S_l|T_i)P(T_i)} \quad (1)$$

In Formula (1), Ti represents that each lane marking type is correct, Sfc represents a lane marking type determination result of the front camera, Sl represents a lane marking determination result of the LiDAR, P (Sfc|Ti) represents a likelihood in which a result recognized by the front camera is each lane marking type, P (Sl|Ti) represents a likelihood in which a result recognized by the LiDAR is each lane marking type, P(Ti) represents a prior probability, and P(Ti|Sfc, Sl) represents a posterior probability. Here, the prior probability indicates each likelihood registered in the associated lane marking being tracked. In the present example, the likelihood integration method using the Bayesian estimation has been described, but an average of likelihoods of lane marking types estimated by the respective sensors 110 may be obtained, or a weighted average may be obtained by adding a weight for each sensor type.

Next, in S224, the lane marking type integration unit 220 determines the type of lane marking on the basis of the likelihood integrated in S223. In the present example, a lane marking having a likelihood of 0.4 or more is assigned as a lane marking type. Here, in a case where likelihoods of a plurality of lane markings are high, a plurality of lane marking types are assigned. In the present example, although the threshold of the likelihood is set to 0.4, this numerical value may be freely determined.

Next, in S225, the lane marking type integration unit 220 registers the lane marking information in a list (FIG. 10) on the memory. In the list, a lane marking ID and a likelihood of each lane marking type are registered.

Figure 11:
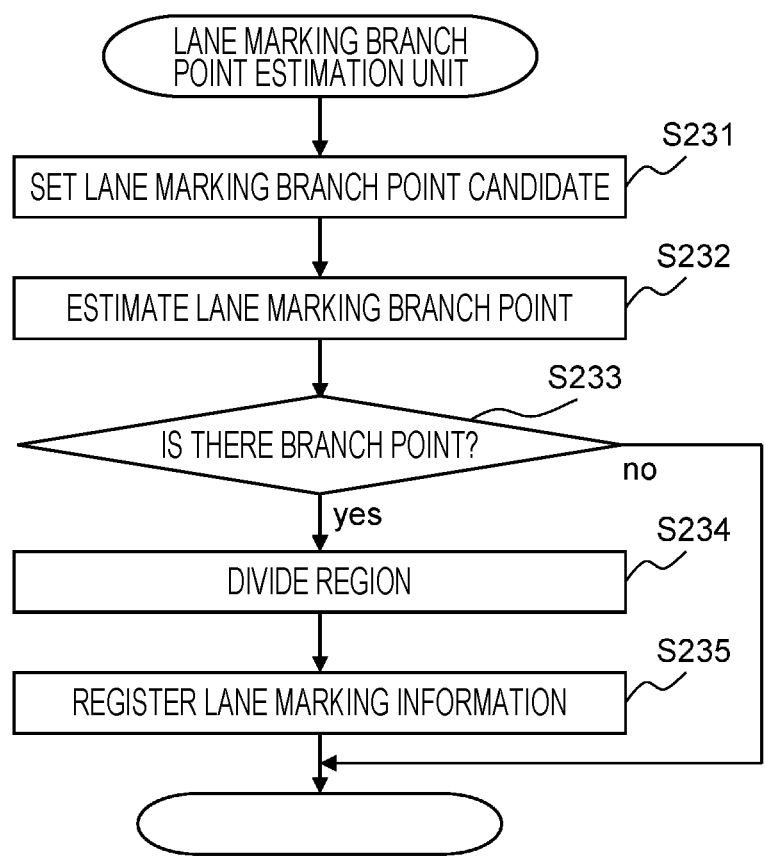
FIG. 11 is a flowchart illustrating processing executed by a lane marking type branch point estimation unit of Example 1.
Figure 12:
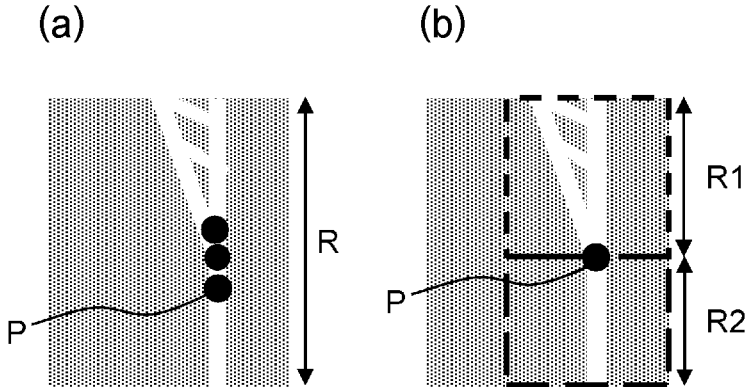
FIG. 12 is a diagram illustrating an example of a lane marking type branch point estimation method according to Example 1.

Next, the lane marking type branch point estimation unit 230 will be described with reference to FIG. 11. First, in S231, the lane marking type branch point estimation unit 230 sets lane marking branch point candidates. In the setting of the branch point candidates of the lane marking type, a ratio is calculated on the basis of the lane marking type set in FIG. 10 and the likelihood of each type, and a branch point candidate is set from the ratio. An example of setting branch point candidates is illustrated in FIG. 12(a). This example shows a lane marking having a lane marking ID3 in FIG. 10. From the list in FIG. 10, the type of the corresponding lane marking is assigned to the type of a single lane marking and the type of a zebra zone. The likelihood of the single lane marking is 0.4, and the likelihood of the zebra zone is 0.4. From here, candidate points are determined by using two methods. One is a ratio between likelihoods of types. Since the ratio between likelihoods is 1:1, a candidate point is set at the center of a detection distance R illustrated in FIG. 12(a). The other is a ratio to a detection region. In the present example, since both of the likelihood values of the lane marking types are 0.4, the detection distance R×0.4 from the own vehicle side and the detection distance R×0.4 from the limit side of the detection distance (far side from the own vehicle) are set. In the case of performing setting according to this method, three candidate points are set as in P in FIG. 12(a). This process is performed only in a case where a plurality of lane marking types are assigned to one lane marking. A method of setting a candidate point is not limited to this method.

Next, in S232, the lane marking type branch point estimation unit 230 estimates a lane marking branch point from the branch point candidates set in S231. In the estimation of a lane marking branch point, after division at the position of the set branch point candidate, a likelihood of each lane marking type is calculated for each of the regions after division (S212). For example, in a case where a region is divided at the middle point among the points P illustrated in FIG. 12(a), the region is divided into a region R1 and a region R2 as illustrated in FIG. 12(b). The process in S212 is executed for each of the regions after division. In the present example, the point P at which the likelihood of the single lane marking and the zebra zone is the highest in each corresponding region is obtained. In the illustrated example, the middle point P at which the likelihood of the single lane marking is the highest at R1 and R2 of the zebra zone is a change point. In the present example, a point at which a likelihood of a lane marking type for each region is high is set as a change point, but a lane marking branch point may be obtained by using a lane marking model for a branch point or image template matching. This process is performed only in a case where a plurality of lane marking types are assigned to one lane marking.

In a case where there is a lane marking of which a branch point has been detected in the processing so far (yes in S233), the processing proceeds to the process in S234, and in a case where there is no branch point (no in S233), the processing of the lane marking type branch point estimation unit 230 is ended.

In S234, the lane marking type branch point estimation unit 230 divides the region on the basis of the detected branch point as illustrated in FIG. 12(b). The region is divided into the near side of the own vehicle and the far side of the own vehicle on the basis of the branch point.

In S235, the lane marking type branch point estimation unit 230 re-registers the lane marking information for each of the regions after division in the list. In S235, not only the lane marking type but also the point sequence representing the lane marking belonging to each region is divided. In addition, branch point information (a position and which lane marking is divided into which lane marking) is also registered.

Figure 13:
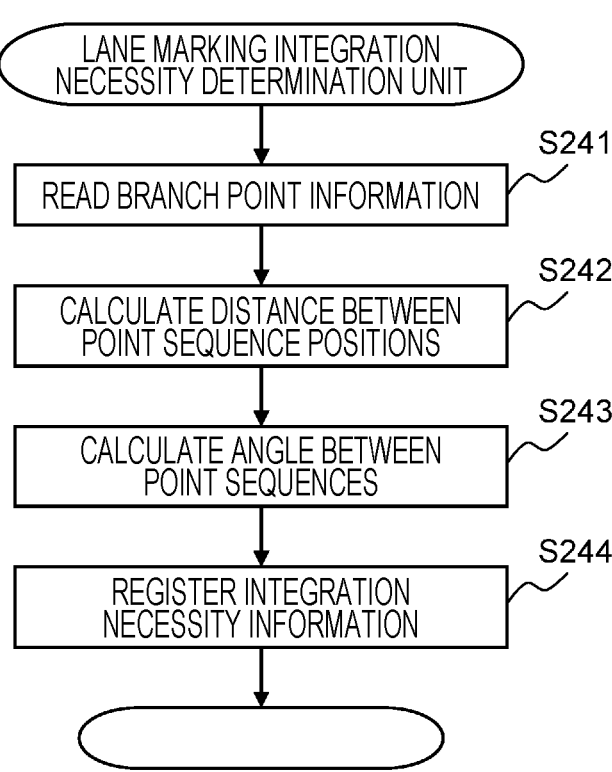
FIG. 13 is a flowchart illustrating processing executed by a lane marking integration necessity determination unit according to Example 1.

Next, the lane marking integration necessity determination unit 240 will be described with reference to FIG. 13. The lane marking integration necessity determination unit 240 determines whether to recombine the divided lane marking information. In a case where the lane marking type branch point is not detected in the previous process, the processing of the lane marking integration necessity determination unit 240 is skipped. First, in S241, the lane marking integration necessity determination unit 240 reads the branch point information.

Next, in S242, the lane marking integration necessity determination unit 240 calculates a distance between the point sequence positions belonging to each region by using the branch point information read in S241. This is intended to divide distant lane markings, such as in a case where a point sequence before and after an intersection is acquired. In the present example, division is performed in a case where a distance between the point sequences is 3 m or more with reference to the threshold of the broken line. Otherwise, the processing proceeds to S243.

Next, in S243, the lane marking integration necessity determination unit 240 calculates an approximation parameter by using the point sequence of each of the regions after division. Since the approximation parameter has already been described, the description thereof will be omitted. Here, an angle between the point sequences is calculated by using the obtained approximation parameter. Here, in a case where the angle is equal to or more than a predetermined threshold, it is considered that the number of lanes such as a lane increase portion increases, and thus, division is performed.

Next, in S244, the lane marking integration necessity determination unit 240 registers information regarding whether to integrate or divide the lane markings in the vicinity of the branch point. The registered information is used in the subsequent processing.

Figure 14:
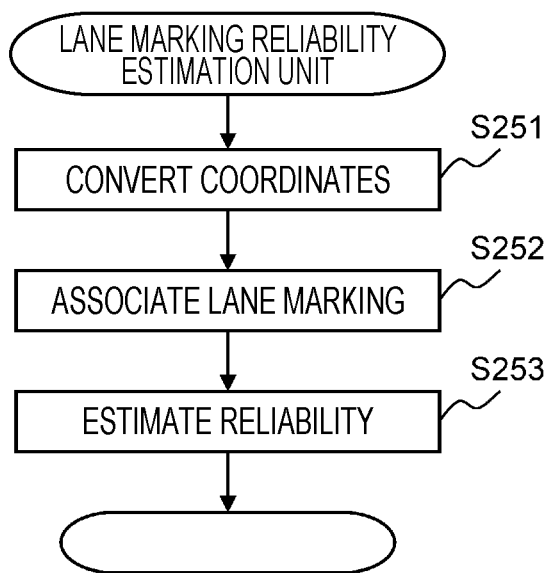
FIG. 14 is a flowchart illustrating processing executed by a lane marking reliability estimation unit according to Example 1.

Next, the lane marking reliability estimation unit 250 will be described with reference to FIG. 14. The lane marking reliability estimation unit 250 assigns a reliability to the lane marking information obtained so far. In the lane marking reliability estimation unit 250, first, in S251, the lane marking reliability estimation unit 250 converts coordinates of the lane marking information and integrates the coordinates into the same coordinate system. Since the method of coordinate conversion has already been described, the description thereof will be omitted.

Next, in S252, the lane marking reliability estimation unit 250 associates the lane markings by using the coordinate-converted lane markings. The lane markings are associated in units of divided lane markings. Also here, the lane markings are similarly associated with lane markings tracked in the past. Since the method of associating the lane markings has already been described, the description thereof will be omitted.

Next, in S253, the lane marking reliability estimation unit 250 estimates a reliability of each lane marking. In an overlapping region of the observation range of the sensor 110, the reliability is estimated on the basis of whether or not the same lane marking can be detected by each sensor 110. For example, in a case where the camera and the LiDAR have an overlapping region in front of the own vehicle, a reliability of a lane marking detected only by one sensor 110 is set to 0.5, and a reliability of a lane marking detected by both sensors 110 is set to 1.0. In an example in which a reliability is set according to the number of sensors 110 that can detect a lane marking, an existence probability of the lane marking may be calculated on the basis of Bayesian estimation from the number of times of tracking or whether or not tracking can be performed, and the calculated existence probability may be used as a reliability.

Next, the lane marking information integration unit 260 will be described with reference to FIG. 15. The lane marking information integration unit 260 integrates the detected lane marking information. First, in S261, the lane marking information integration unit 260 converts the coordinates of the lane marking information, and a coordinate conversion process has already been described, and thus the description thereof will be omitted.

Next, in S262, the lane marking information integration unit 260 associates the lane markings. Here, association using an approximation parameter and association using a lane marking type are performed. Since the association using an approximation parameter has already been described, the description thereof will be omitted. In the association using a lane marking type, two processes are executed. One is validity determination using a lane marking type. For example, as illustrated in FIG. 16, in a case where a road width a is 6 m or more in two lanes on one side, the center line is a white solid line. As described above, a road situation can be estimated from the lane marking information. Thus, the road situation is estimated by using the estimated lane marking position with high reliability. In this case, in a case where a lane marking having low reliability, for example, a lane marking of which a lane marking type is a broken line is detected near the center line in the situation in FIG. 16, the lane marking is excluded from targets of association and tracking. The other is association for each lane marking region. The detected lane marking information is managed for each lane marking type. This is because a point sequence expressing the detected lane marking position sets the inside D of a lane marking T as the lane marking position as illustrated in FIG. 17. From this, an approximation parameter is estimated for each of lane marking regions, a distance between lane markings is obtained between the same lane marking types, and the lane markings are associated with each other.

Next, in S263, the lane marking information integration unit 260 integrates the information regarding the lane marking regions associated in S262. Here, since it is assumed that the lane marking information matches, point sequence parameters expressing the position of the lane marking are integrated. As described above, by managing a point sequence representing a lane marking for each lane marking type, the lane marking is stably tracked. Although a point sequence is managed by being divided for each of the lane marking regions, a connection relationship for each of the lane marking regions is stored at the lane marking type branch point, and thus, there is no problem of lane marking tracking.

As described above, after the series of processes is executed, the lane marking information is output to an external application that uses the lane marking information.

Example 2

In Example 2, a scene understanding unit 270 is added to the driving assistance device 100. With the addition of the scene understanding unit 270, processing of the lane marking type integration unit 220 and the lane marking reliability estimation unit 250 is changed.

In order to accurately recognize a lane marking, it is necessary to prioritize sensor information acquired by the sensor 110 in consideration of a scene in which a lighting environment greatly changes, such as backlight or a tunnel entrance/exit by recognizing the environment around a vehicle and the weather such as rain and fog. From the viewpoint of a lane marking type, a dot line is likely to appear in a scene of a downward curve, and a zebra zone or a lane marking having a complicated shape is likely to appear near an intersection. The scene understanding unit 270 of Example 2 assumes a function of recognizing these external factors.

Figure 18:
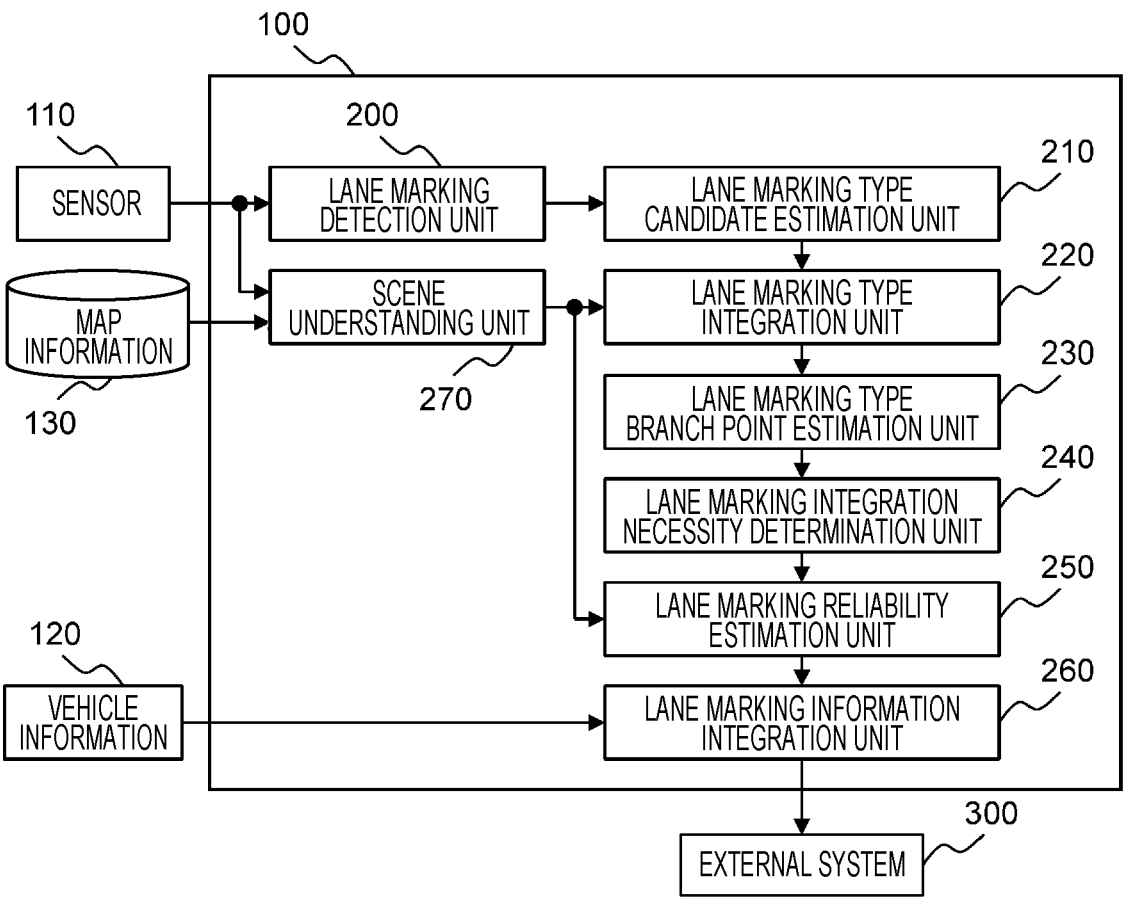
FIG. 18 is a diagram illustrating a configuration of a driving assistance device according to Example 2.

FIG. 18 is a diagram illustrating a configuration of a driving assistance device 100 according to Example 2 of the present invention. As illustrated in FIG. 18, the driving assistance device 100 includes, as functions thereof, a lane marking detection unit 200, a lane marking type candidate estimation unit 210, a lane marking type integration unit 220, a lane marking type branch point estimation unit 230, a lane marking integration necessity determination unit 240, a lane marking reliability estimation unit 250, a lane marking information integration unit 260, and a scene understanding unit 270, and outputs a calculation result to an external system 300.

First, the scene understanding unit 270 will be described. The scene understanding unit 270 roughly recognizes two scenes. One is a scene in which the recognition performance of the sensor 110 significantly deteriorates. This is, for example, a scene in which a proof condition such as backlight or a tunnel entrance/exit greatly changes, a scene in which a sensing range is interrupted due to adhesion of water, dirt, or the like to a windshield or a lens of a camera, or a weather factor such as rain, fog, or snow. The other is a scene in which a specific lane marking type such as a curve on a downhill or a road marking is likely to appear. Therefore, map information 400 is input to the scene understanding unit 270.

Figure 19:
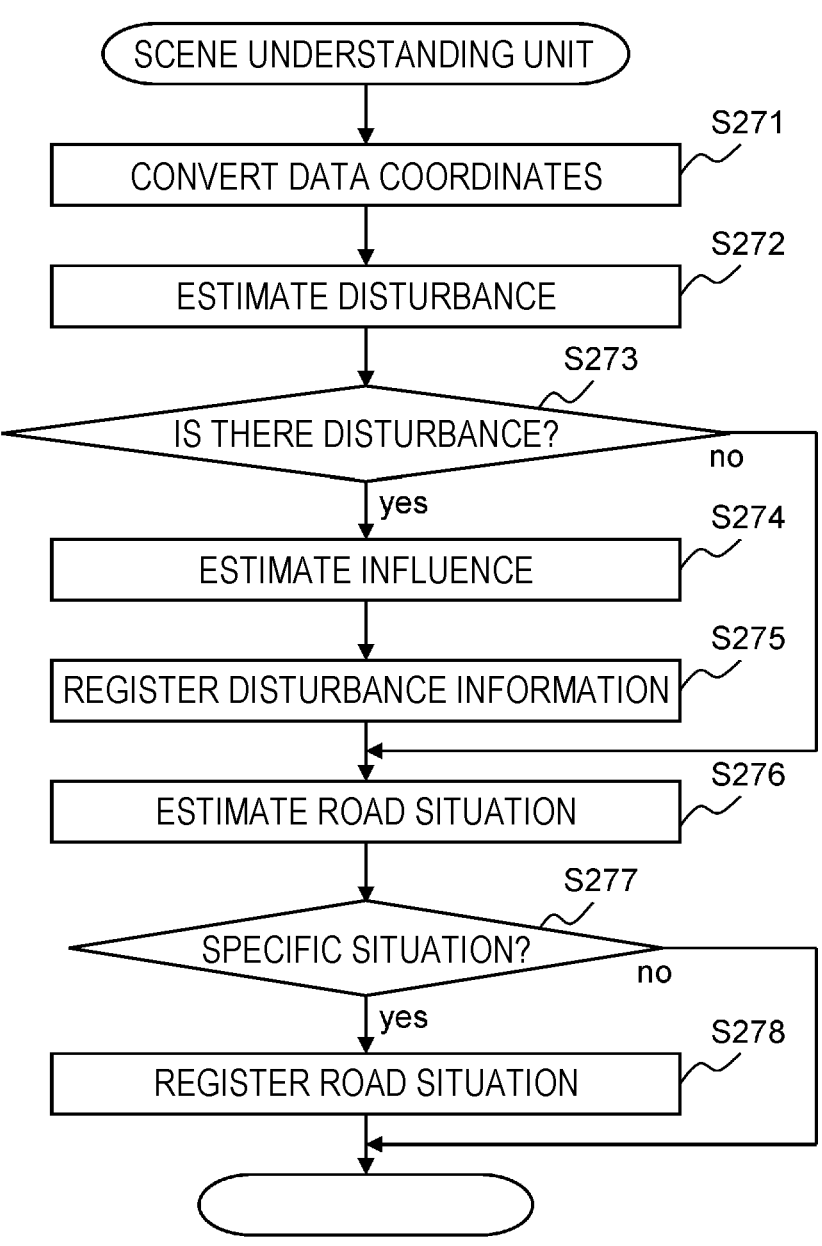
FIG. 19 is a flowchart illustrating processing executed by a scene understanding unit according to Example 2.

Next, the scene understanding unit 270 will be described with reference to FIG. 19. First, in S271, the scene understanding unit 270 converts coordinates of data acquired by the various sensors 110. In the present example, in the coordinate conversion of the data, distance information acquired by the LiDAR is projected onto an image. The coordinates of the data may be converted by using relative position and posture between the sensors 110. Since coordinate conversion using relative position and posture between the sensors 110 is known, the description thereof will be omitted.

Next, in S272, the scene understanding unit 270 recognizes a scene in which the recognition performance of the sensor 110 significantly deteriorates. Since a scene in which the recognition performance of the sensor 110 significantly deteriorates depends on the sensor 110 mounted the own vehicle, a scene in which the performance deteriorates is set in advance for each configuration of the sensor 110. For the set scene, for example, backlight or a tunnel entrance/exist is determined by detecting a scene in which luminance in the image greatly changes, or an attachable matter to a lens or a windshield is determined by an object recognized at the same place for a certain period of time. A scene may be determined according to machine learning in which a target scene is learned in advance.

Figure 20:
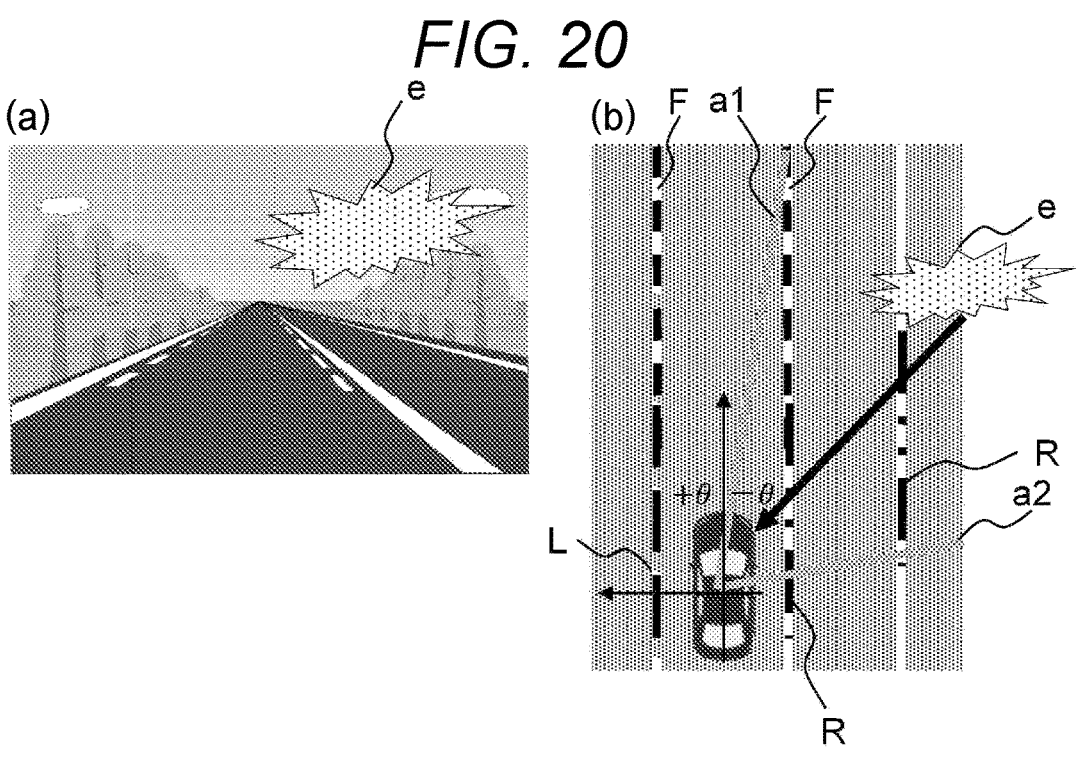
FIG. 20 is a diagram illustrating example of a scene understanding method according to Example 2.

Next, in S273, in a case where a scene in which the recognition performance significantly deteriorates is recognized in S272, the scene understanding unit 270 estimates a sensing region with the sensor 110 influenced in S274. Estimation of the sensing region using the influenced sensor 110 is performed by the following procedure. First, in a case where a performance deterioration factor e (backlight) of the sensor 110 is recognized in S272 from a scene as illustrated in FIG. 20(a), for example, an image, it is estimated in which direction of the own vehicle a disturbance factor exists on the basis of the position on the image. The direction in which the disturbance factor exists can be easily estimated if a mounting position of the sensor 110 with respect to the own vehicle is known. Thereafter, in consideration of the direction, the influence range, and the sensor type from which the data is acquired, for example, in the situation illustrated in FIG. 20(b), a detection result within a range divided by a1 to a2 is estimated as a sensing region by the sensor 110 influenced by the performance deterioration factor e. As a result, it is estimated that a detection result from the front camera is influenced by a part of the right of F and a detection result from the right camera is influenced by R, and it is estimated that the detection result from the front camera is not influenced by a part of the left of F and a detection result from the left camera is not influenced. Here, the sensor type is taken into consideration, for example, even in a scene in which the sensor 110 is influenced by backlight, a result of detecting a lane marking with the camera is influenced, and a result of detecting the lane marking with the LiDAR is not influenced. Therefore, only a detection result from the influenced sensor 110 is targeted.

Next, in S274, the scene understanding unit 270 estimates information regarding the estimated disturbance, the sensor 110 influenced by the disturbance, and the lane marking influenced by the disturbance, and in S275, registers the estimated information in the list illustrated in FIG. 8. In this case, the disturbance factor is registered in the list on the basis of the information regarding the influenced sensor 110 and the lane marking.

Next, in S276, the scene understanding unit 270 refers to the map information 400 to recognize a road situation in which a specific lane marking type is likely to appear. In the case of an environment in which an appearance frequency of a lane marking is biased, such as a curve on a downhill or the vicinity of a junction of an expressway, a lane marking likelihood initial value indicating an appearance probability of a lane marking type in which the appearance frequency is biased (that is, the lane marking type is likely to appear) in a surrounding situation as illustrated in FIG. 22(b) is read from the list and set as an initial value of a likelihood of each lane marking. Which road situation is estimated varies depending on the lane marking type desired to be identified, and thus a road situation is not limited. Similarly to the disturbance estimation, a road situation can be recognized by using machine learning in which an environment desired to be identified is learned in advance or template matching of a road marking.

Next, in a case where a specific road situation is recognized in S276 (yes in S277), the scene understanding unit 270 registers the road situation in the memory in S278.

Figure 21:
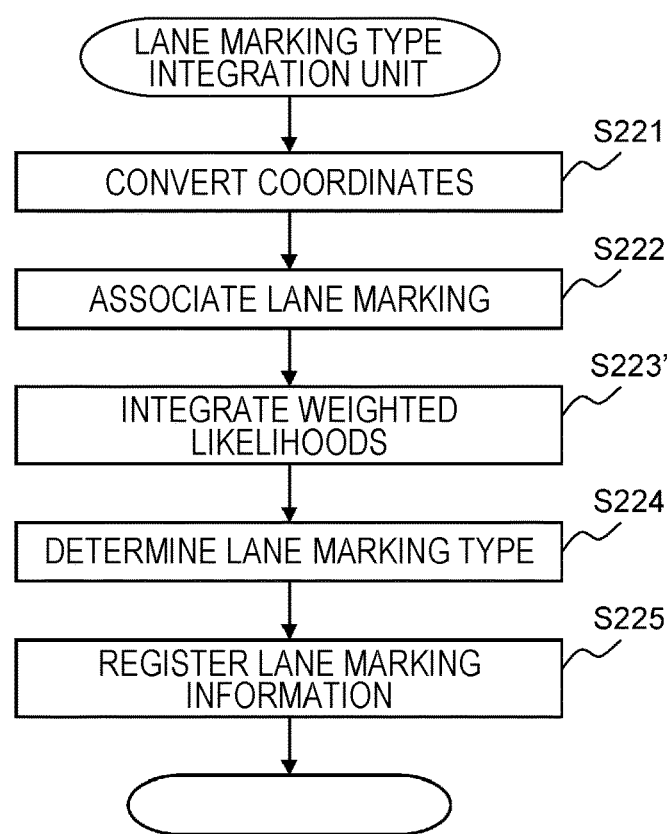
FIG. 21 is a flowchart illustrating processing executed by a lane marking type integration unit according to Example 2.

Next, with reference to FIG. 21, a description will be made of the lane marking type integration unit 220 of which processing content changes with the addition of the scene understanding unit 270. In FIG. 21, since the processes in S221, S222, S224, and S225 are the same as those in FIG. 9, the description thereof will be omitted. In S223', in order to use the influence of the disturbance factor, which is recognized by the scene understanding unit 270, on the sensor 110 for the lane marking type integration, a sensor type and a reliability of each recognition result due to the disturbance influence as illustrated in FIG. 22(a), which are set in advance, are read and used. Here, the sensor type and the disturbance are written in the list in FIG. 8, the list in FIG. 22(a) is searched on the basis of the information, and a reliability of the lane marking is set. In this case, a formula for likelihood integration using a reliability is calculated by substituting a weight as in the following Formulas (2) and (3) into P (Sfc|Ti) expressed in Formula (1). Here, 0 indicates a state in which the reliability is the lowest, and 1 indicates a state in which the reliability is the highest.

[Math. 2]

$$P(S_i|T_0)' = P(S_i|T_0) * R \tag{2}$$

[Math. 3]

$$P(S_i|T_1)' = P(S_i|T_1) * (1 - R) \tag{3}$$

Here, Si is a sensor type, T0 is a probability of being a correct answer, T1 is a probability of being an incorrect answer, and R is a reliability.

Figure 23:
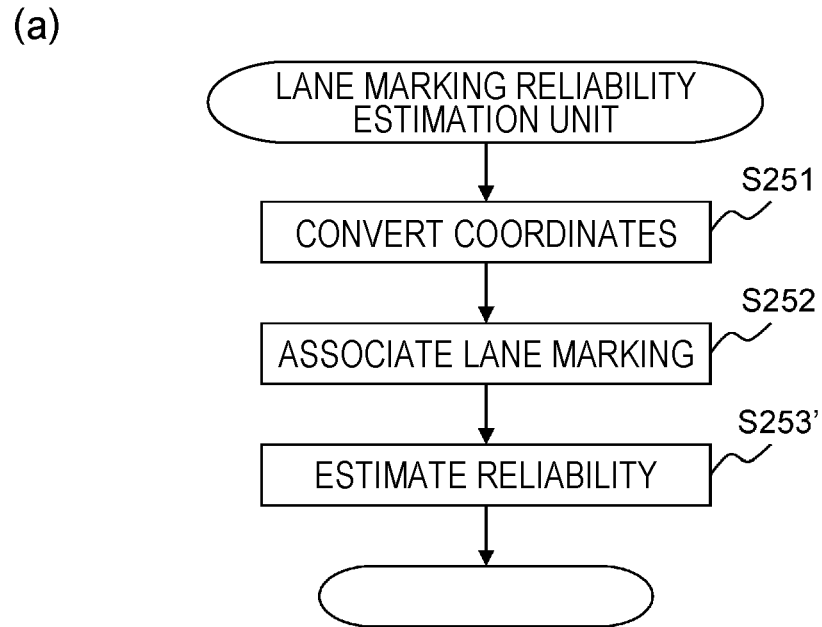
FIG. 23 is a flowchart illustrating processing executed by the lane marking type integration unit according to Example 2.

Next, with reference to FIG. 23(a), a description will be made of the lane marking reliability estimation unit 250 of which processing content changes with the addition of the scene understanding unit 270. In FIG. 23(a), since the processes in S251 and S252 are the same as those in FIG. 14, the description thereof will be omitted. In S253', similarly to S223', in order to use the influence of the disturbance factor, which is recognized by the scene understanding unit 270, on the sensor 110 for the lane marking type integration, the sensor type illustrated in FIG. 23(b) and the reliability of each recognition result due to the disturbance influence, which are set in advance, are read, and the reliability of the lane marking is set. Here, the sensor type and the disturbance are written in the list in FIG. 8, the list in FIG. 23(b) is searched on the basis of the information, and a reliability of the lane marking is obtained. The reliability of the lane marking is added to each region of the lane marking type. In a case where one lane marking is detected by two sensors 110, a detection result from the sensor 110 having a higher reliability may be used. Here, the reliability of the lane marking is registered in the list in advance on the basis of the sensor type, the disturbance, and the lane marking type. This is because it is particularly difficult to recognize an orange line in situations such as backlight and twilight. However, since it is conceivable that a reliability cannot be set due to a relationship of a memory capacity or the like, a method of setting a reliability is not limited thereto.

Example 3

Figure 24:
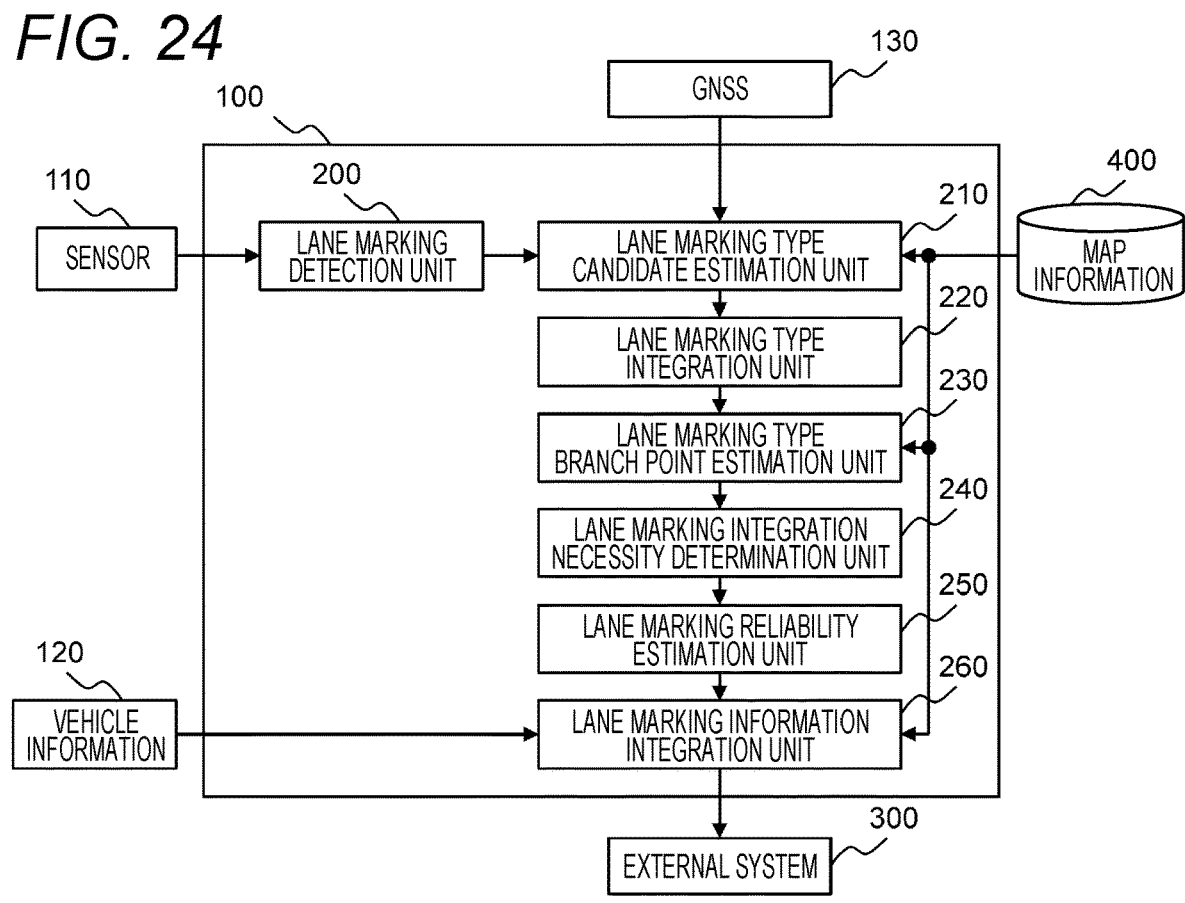
FIG. 24 is a diagram illustrating a configuration of a driving assistance device according to Example 3.

An example in a case where map information 400 is combined will be described with reference to FIG. 24. The map information 400 may be either a high-precision map in which information such as a width of a road, a lane marking, connection between lanes, and the like is described in detail, or a navigation map including intersection information and the like. By using lane marking information registered in the map information 400 and information such as the number of lanes and a road width, it is possible to more accurately determine a lane marking type, estimate a lane marking branch point, and integrate lane marking information. The map information 400 is used for processing of the lane marking type candidate estimation unit 210, the lane marking type branch point estimation unit 230, and the lane marking information integration unit 260 in FIG. 24. Thus, processing of the functional blocks 210, 230, and 260 of which processing content is changed will be described.

Figure 25:
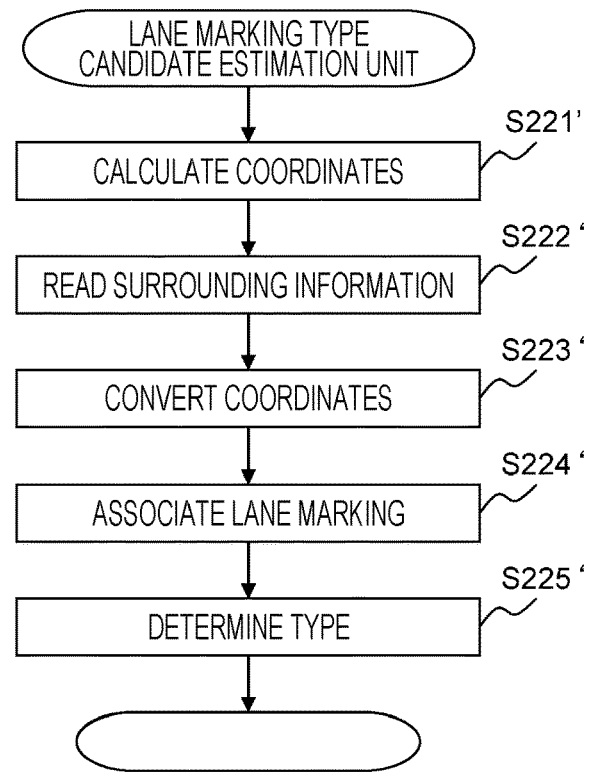
FIG. 25 is a flowchart illustrating processing executed by a lane marking type candidate estimation unit according to Example 3.

Next, the lane marking type candidate estimation unit 210 will be described with reference to FIG. 25. The lane marking type candidate estimation unit 210 estimates lane marking type candidates in consideration of the map information 400. First, in S221', the lane marking type candidate estimation unit 210 calculates which position on the map a position of the own vehicle corresponds to in order to read the map information 400. For example, the position of the own vehicle on the map is calculated by using latitude, longitude, and altitude acquired by a GNSS, and surrounding information of the own vehicle is read from the map information 400. In this case, since the information acquired from the GNSS may include an instantaneous error due to the influence of multipath or the like, a value estimated from data for several frames by using a time-series filter or the like may be used.

Next, in S222', the lane marking type candidate estimation unit 210 reads surrounding information of the own vehicle from the map information 400. The surrounding information is limited by the map information 400 to be used. In the present example, on the assumption that a high-precision map is used, a lane marking type, a lane marking position, the number of lanes, a road width, and lane connection information are read. A range in which the map information 400 is read is information within a predetermined distance from the own vehicle.

Next, in S223', the lane marking type candidate estimation unit 210 converts the information read in S222' into a coordinate system centered on the own vehicle. The coordinate conversion is performed by a known method such as Hubeni's formula by using the latitude and the longitude acquired from the GNSS information.

Next, in S224', the lane marking type candidate estimation unit 210 associates the map information 400 of which the coordinates have been converted in S223' with the lane marking detected by the own vehicle. Since the lane marking position information obtained from the map information 400 is a point sequence, this association is performed in the same manner as the association between lane markings. Even in a case where the lane marking information obtained from the map information 400 is expressed by a function instead of a point sequence, point sequence information can be obtained through sampling at predetermined intervals.

Next, in S225', the lane marking type candidate estimation unit 210 determines a lane marking type. The lane marking type may be determined by assigning the lane marking type in the map information 400 associated with the lane marking information detected by the own vehicle. In a case where the lane marking information acquired from the map information 400 is not associated with the lane marking detected by the own vehicle, it is determined that the lane marking is erroneously detected, and the detected lane marking information is deleted. By assuming that the map information 400 is the latest one, the lane marking information which is not associated is deleted. Thus, in a case where there is an intention to update the map, the lane marking type may be estimated by using the method of Example 1 with the lane marking type obtained from the map information 400 as an initial value. In a case where a map in which a lane marking type or the like is not registered, such as a navigation map, is used, the map information 400 is used by changing a value of an initial value at the time of lane marking type determination by using information such as before an intersection or before a curve.

The lane marking type branch point estimation unit 230 uses the result of association between the lane marking information read from the map information 400 by the lane marking type candidate estimation unit 210 and the detected lane marking to set a branch point of the lane marking type for the lane marking which the corresponding lane marking has been detected. In a case where the branch point of the lane marking type is not registered in the map information 400, the branch point is estimated according to the method of Example 1.

Figure 26:
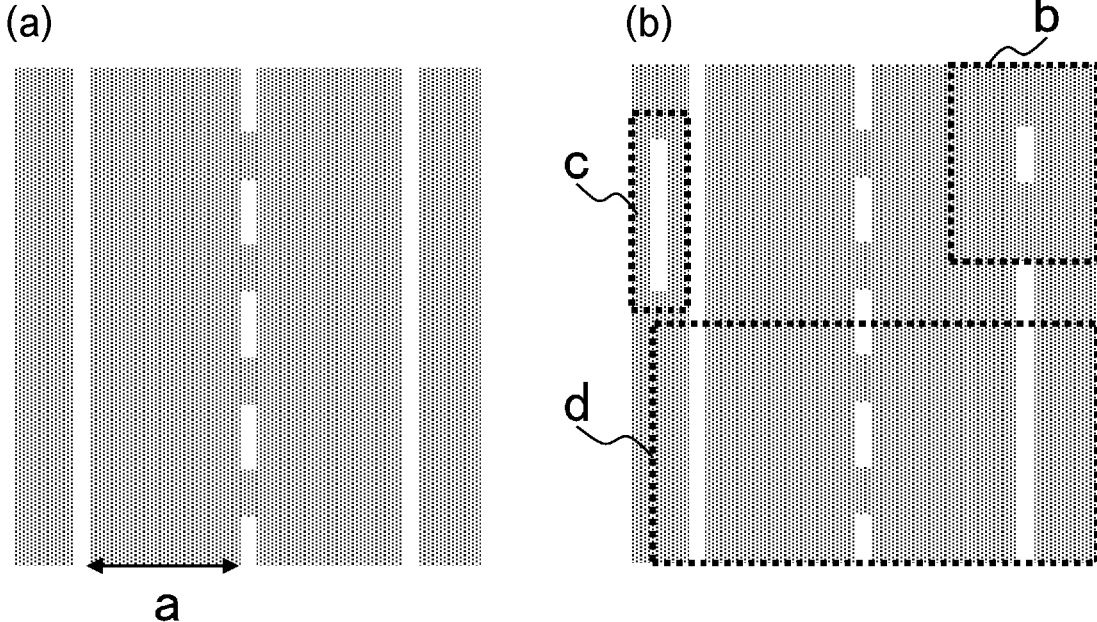
FIG. 26 is a diagram illustrating an example of a lane marking candidate type estimation method according to Example 3.

The lane marking information integration unit 260 integrates the lane markings by using the number of lanes, the road width, and the lane marking type registered in the map information 400. The lane marking information integration process is basically the same as that illustrated in FIG. 15, and the map information 400 is used for the lane marking integration in S263. For example, it is assumed that an observation result as illustrated in FIG. 26(b) is obtained when the map information 400 as illustrated in FIG. 26(a) is obtained. Here, b in the drawing indicates a lane marking determined as a broken line due to blurring of a solid line, c in the drawing indicates a solid line in which a structure such as a guardrail is erroneously detected, and d in the drawing indicates lane marking information being tracked. Here, first, lane marking information considered to be erroneously detected is removed from the lane marking information observed by the own vehicle by using the number of lanes and the road width registered in the map information 400. In this case, the distance a between the respective lane markings is calculated as illustrated in FIG. 26(*a*) by using the observed respective lane marking positions. With an absolute value of a difference between the distance calculated from each of combinations of the lane markings and the distance a between the respective lane markings as a score, a combination having the smallest score is found by using an association method such as the Hanger method. In this case, the number of lanes indicated in the map information 400 is set to the maximum value for the combination to be found. Through this process, erroneous detection as in c in the drawing is removed. Through this process, a lane marking being tracked next and a newly observed lane marking are associated with each other by using the selected observation value. Since an association method has already been described, the description thereof will be omitted. Finally, the lane marking type of the associated lane marking is corrected. In the correction, as in b in the drawing, different lane marking information compared with the map information 400 is overwritten with the map information 400 as an erroneous determination result.

The lane marking information estimated through the series of processes is output to the external system 300.

Example 4

In Example 4, an example in which lane marking information estimated by using the driving assistance device 100 is registered as the map information 400 will be described. The map information 400 is registered in a storage device in a server or the driving assistance device. In a case where the lane marking information is registered in the map information 400, the external system 300 in FIG. 24 serves as the map information 400. Since the driving assistance device has already been described in Examples 1 to 3, the description thereof will be omitted.

A case is assumed in which the registration of the lane marking information in the map information 400 is different from that in which the lane marking information is registered due to a reason such as generation of a map on which a lane marking, an obstacle position, and the like of a surrounding environment used for automated driving are written or under construction. The map may be generated or updated at a timing at which the system side recognizes that there is no surrounding map, or the map may be generated or updated when a user changes a mode to a map generation/update mode. The map information 400 is recorded after being converted from a coordinate system centered on the own vehicle to a coordinate system that can be expressed by an absolute value by using information from the GNSS or the like. As a result, it is also possible to share the map between vehicles. The information to be registered in the map is a lane marking position, a lane marking type, a lane marking branch point, and time. The lane marking branch point is registered and can thus be used for estimation of a position in the vehicle front-rear direction that is difficult in self-position estimation using the map information 400 or switching between processes when the own vehicle enters an intersection.

As described above, the driving assistance device 100 according to the example of the present invention includes the lane marking detection unit 200 that detects lane marking information from data acquired by the sensor 110, the lane marking type candidate estimation unit 210 that recognizes the type of the lane marking from the detected lane marking information and calculates a likelihood of each type, the lane marking type branch point estimation unit 230 that detects a lane marking type branch point that is a point at which the likelihood of the lane marking type changes with respect to an advancing direction of an own vehicle, and distinguishes regions before and after the lane marking type branch point as a first region and a second region, and the lane marking information integration unit 260 that integrates a lane marking of the first region and a lane marking of the second region into a continuously recognizable lane marking. Therefore, lane markings to be tracked can be continuously recognized and thus the lane markings can be tracked with high accuracy.

The driving assistance system includes the lane marking integration necessity determination unit 240 that determines necessity of integration of the lane marking of the first region and the lane marking of the second region. In a case where the lane marking integration necessity determination unit 240 determines that integration is necessary, the lane marking information integration unit 260 integrates the lane marking of the first region and the lane marking of the second region into a continuously recognizable lane marking. Therefore, even in a case where a road structure is complicated and there are many white lines in an oblique direction, the lane markings can be integrated.

The driving assistance system includes the scene understanding unit 270 that estimates a situation around the vehicle from the data acquired by the sensor 110, and the lane marking reliability estimation unit 250 that estimates a reliability of the lane marking type determined for each sensor 110 on the basis of an output of the scene understanding unit 270 and determines a reliability of the lane marking for each sensor 110. The lane marking type candidate estimation unit 210 refers to the estimated reliability and determines lane marking information of a lane marking type candidate for each sensor 110 on the basis of an edge of the lane marking by using at least one of a luminance and a reflection intensity acquired by the sensor 110. Therefore, even if the information acquired by the sensor 110 is influenced by the disturbance, a lane marking can be accurately tracked.

The lane marking type candidate estimation unit 210 calculates a likelihood of each lane marking type by comparing luminance information of a lane marking sampled at regular intervals in the advancing direction of the own vehicle with a lane marking shape model obtained by modeling luminance information, so that the lane marking can be tracked by the same logic regardless of the type (a camera, a LiDAR, or the like) of the sensor 110.

The lane marking information integration unit 260 associates the lane markings by using the lane marking type and integrates the lane marking information, so that the lane marking can be tracked with higher accuracy than simply viewing a position, and erroneous detection of the lane marking due to erroneous association can be reduced.

The lane marking type branch point estimation unit 230 divides the lane marking into the regions before and after the lane marking type branch point and manages the lane marking information for each lane marking type, so that the type of the lane marking can be accurately determined before and after the branch point.

In a case where a plurality of lane marking types are assigned, the lane marking type branch point estimation unit 230 detects the lane marking branch point on the basis of a ratio of the likelihood of the lane marking type, so that complicated processing becomes unnecessary and the type of the lane marking can be quickly determined with a low load.

Since the reliability of the lane marking is set on the basis of the disturbance factor, the sensor type, and the lane marking type, even if the appearance of the lane marking changes due to the disturbance, the scene understanding unit 270 can accurately recognize the lane marking regardless of the influence of the disturbance by setting weights finely according to the disturbance factor.

The lane marking information integration unit 260 integrates the lane markings of the type of which a likelihood is calculated for each sensor 110 by using the likelihood of the lane marking type that is likely to appear in the situation around the vehicle estimated by the scene understanding unit 270, so that the lane marking type can be quickly and accurately recognized.

The lane marking type candidate estimation unit 210 recognizes the type of the lane marking from the detected lane marking information and the map information 400, and the lane marking type branch point estimation unit 230 detects the lane marking type branch point that is a point at which the likelihood of the lane marking type changes in the traveling direction of the own vehicle by using the map information 400, so that the lane marking type and the change point can be quickly and accurately recognized.

Since the lane marking information integration unit 260 integrates the lane marking of the first region and the lane marking of the second region by using the number of lanes and the road width acquired from the map information 400, it is possible to prevent erroneous recognition that a structure such as a guardrail is a lane marking.

The lane marking information integration unit 260 integrates the lane markings of the type of which the likelihood is calculated for each sensor 110 by using the likelihood of the lane marking type that is likely to appear at the position estimated from the map information 400, so that the lane marking type can be recognized quickly and accurately.

Since the lane marking information integration unit 260 registers the information regarding the position, the type, and the branch point of the integrated lane marking in the map information, the latest information can be reflected on the map to update the map information.

Note that the present invention is not limited to the above-described examples, and includes various modifications and equivalent configurations within the concept of the appended claims. For example, the above-described examples have been described in detail for easy understanding of the present invention, and the present invention is not necessarily limited to those having all the described configurations. A part of the configuration of one example may be replaced with the configuration of another example. The configuration of another example may be added to the configuration of a certain example. A part of the configuration of each example may be added, deleted, or replaced with another configuration.

Some or all of the above-described configurations, functions, processing units, processing means, and the like may be realized by hardware by being designed, for example, an integrated circuit, or may be realized by software by a processor interpreting and executing a for program realizing each function.

Information such as a program, a table, and a file for realizing each function can be stored in a storage device such as a memory, a hard disk, or a solid state drive (SSD), or a recording medium such as an IC card, an SD card, or a DVD.

Control lines and information lines that are considered to be necessary for description are illustrated, and not all control lines and information lines necessary for implementation are illustrated. In practice, it may be considered that almost all the configurations are connected to each other.

REFERENCE SIGNS LIST

100 driving assistance device
110 external recognition sensor
120 vehicle information
130 GNSS receiver
200 lane marking detection unit
210 lane marking type candidate estimation unit
220 lane marking type integration unit
230 lane marking type branch point estimation unit
240 lane marking integration necessity determination unit
250 lane marking reliability estimation unit
260 lane marking information integration unit
270 scene understanding unit
300 external system
400 map information

The invention claimed is:

1. A driving assistance device that recognizes a lane marking around an own vehicle with at least one sensor, the driving assistance device comprising:

a lane marking detection unit that detects lane marking information from data acquired by the sensor;

a lane marking type candidate estimation unit that recognizes a lane marking type from the detected lane marking information and calculates a likelihood of each lane marking type;

a lane marking type branch point estimation unit that detects a lane marking type branch point that is a point at which a likelihood of the lane marking type changes with respect to an advancing direction of the own vehicle, and distinguishes regions before and after the lane marking type branch point as a first region and a second region; and a lane marking information integration unit that, in a case where a lane marking of the first region and a lane marking of the second region have a same lane marking type, integrates the lane marking of the first region and the lane marking of the second region into a continuously recognizable lane marking.

2. The driving assistance device according to claim 1, further comprising a lane marking integration necessity determination unit that determines necessity of integration of the lane marking of the first region and the lane marking of the second region, wherein in a case where the lane marking integration necessity determination unit determines that integration is necessary, the lane marking information integration unit integrates the lane marking of the first region and the lane marking of the second region into a continuously recognizable lane marking.

3. The driving assistance device according to claim 1, further comprising:

a scene understanding unit that estimates a situation around the vehicle from the data acquired by the sensor; and a lane marking reliability estimation unit that estimates a reliability of the lane marking type determined for each of the sensors based on an output of the scene understanding unit and determines a reliability of the lane marking for each of the sensors, wherein the lane marking type candidate estimation unit refers to the estimated reliability, and determines lane marking information of a lane marking type candidate for each of the sensors based on an edge of the lane marking by using at least one of luminance and reflection intensity acquired by the sensor.

4. The driving assistance device according to claim 1, wherein the lane marking type candidate estimation unit calculates a likelihood of each lane marking type by comparing luminance information of a lane marking sampled at regular intervals in an advancing direction of the own vehicle with a lane marking shape model obtained by modeling the luminance information.

5. The driving assistance device according to claim 1, wherein the lane marking information integration unit associates the lane markings by using the lane marking type, and integrates the lane marking information.

6. The driving assistance device according to claim 1, wherein the lane marking type branch point estimation unit divides the lane marking into regions before and after the lane marking type branch point and manages the lane marking information for each lane marking type.

7. The driving assistance device according to claim 1, wherein the lane marking type branch point estimation unit detects a lane marking branch point based on a ratio of the likelihood of the lane marking type in a case where a plurality of lane marking types are assigned.

8. The driving assistance device according to claim 3, wherein the scene understanding unit sets a reliability of a lane marking based on a disturbance factor, a sensor type, and a lane marking type.

9. The driving assistance device according to claim 3, wherein the lane marking information integration unit integrates a lane marking of a type of which a likelihood is calculated for each sensor by using a reliability for each sensor based on a situation around the vehicle estimated by the scene understanding unit.

10. The driving assistance device according to claim 3, wherein the lane marking information integration unit integrates a lane marking of a type of which a likelihood is calculated for each sensor by using a likelihood of a lane marking type that is likely to appear in a situation around the vehicle estimated by the scene understanding unit.

11. The driving assistance device according to claim 1, wherein the lane marking type candidate estimation unit recognizes a type of a lane marking from the detected lane marking information and map information, and
the lane marking type branch point estimation unit detects a lane marking type branch point that is a point at which a likelihood of the lane marking type changes in a traveling direction of the own vehicle by using the map information.

12. The driving assistance device according to claim 1, wherein the lane marking information integration unit integrates the lane markings by using the number of lanes and a road width acquired from map information.

13. The driving assistance device according to claim 1, wherein the lane marking information integration unit integrates a lane marking of a type of which a likelihood is calculated for each sensor by using a likelihood of a lane marking type that is likely to appear at a position estimated from map information.

14. The driving assistance device according to claim 1, wherein the lane marking information integration unit registers information regarding a position, a type, and a branch point of the integrated lane marking in map information.

15. A driving assistance method executed by a driving assistance device that recognizes a lane marking around an own vehicle with at least one sensor, wherein the driving assistance device includes an arithmetic device that executes predetermined processing and a storage device that is connected to the arithmetic device, the driving assistance method comprising:

a lane marking detection procedure in which the arithmetic device detects lane marking information from data acquired by the sensor;

a lane marking type candidate estimation procedure in which the arithmetic device recognizes a lane marking type from the detected lane marking information and calculates a likelihood of each lane marking type;

a lane marking branch point estimation procedure in which the arithmetic device detects a lane marking type branch point that is a point at which a likelihood of the lane marking type changes with respect to an advancing direction of the own vehicle, and distinguishes regions before and after the lane marking type branch point as a first region and a second region; and a lane marking information integration procedure in which, in a case where a lane marking of the first region and a lane marking of the second region have a same lane marking type, the arithmetic device integrates the lane marking of the first region and the lane marking of the second region into a continuously recognizable lane marking.

* * * * *